United States Patent [19]
Stipanov

[11] 3,820,342
[45] June 28, 1974

[54] FISH EJECTOR SYSTEM
[76] Inventor: Jerome A. Stipanov, 251 S. Anita Ave., Los Angeles, Calif. 90049
[22] Filed: Nov. 22, 1971
[21] Appl. No.: 200,920

[52] U.S. Cl. ............................................. 61/21
[51] Int. Cl. ........................................... E02b 8/08
[58] Field of Search ............ 61/21; 119/2, 3; 43/100

[56] References Cited
UNITED STATES PATENTS
| | | | |
|---|---|---|---|
| 2,381,100 | 8/1945 | Barr | 61/21 |
| 3,096,600 | 7/1963 | Gwytmer | 61/21 |
| 3,377,805 | 9/1965 | Warner | 61/21 |
| 3,596,468 | 8/1971 | Fairbanks | 61/21 |

Primary Examiner—Louis K. Rimrodt
Assistant Examiner—Alex Grosz
Attorney, Agent, or Firm—Lyon & Lyon

[57] ABSTRACT

A system for removing fish from a moving stream of water by attracting or directing the fish away from the main flow of the stream into a defined zone. The fish attracted to the zone are trapped therein and subsequently removed to another discharge stream which returns the fish to the source of the first stream or to another location substantially without injury to the fish.

16 Claims, 12 Drawing Figures

FISH EJECTOR SYSTEM

This invention relates to a system for ejecting fish from a flow of water and more specifically relates to a system which will attract fish from a particular flow of water and thereafter discharge the removed fish to more favorable water areas without injury to the fish.

Large industrial plants very often require a substantial amount of water such as for cooling purposes. The water intake systems for such plants typically require for their source a large body of water such as a lake, sea, river or ocean which is inhabited by fish, the term fish being used here and throughout this application generally and is intended to cover other similar forms of marine life.

The inlet to these water intake systems is many times normally located at a substantial distance from the plant and/or at a depth within the water source which substantially prevents any maintenance at the inlet end. Thus, the inlet is relatively unrestricted. The screens or other barriers to prevent the fish from entering the plant machinery are located downstream of the water intake inlet and in close proximity to the plant to permit the required maintenance thereof. This and any other arrangement of the fish screens which permits fish to enter the system, however, gives rise to a potentially serious environmental problem involving the entrapment of a substantial number of fish within the system. It has been found that fish sucked through the inlet and into the water intake system when they are eventually screened off do not have sufficient strength or the sense to return to their natural environment. Certain efforts have been made to accomplish the desired removal and return of the fish including fish pumps which have been found to be somewhat satisfactory for the smaller fish. However, such pump systems are harmful to a significant number of the fish being pumped. Moreover, the larger fish, which are particularly common with the ocean source intake systems, present a size problem which in certain instances precludes their removal by such pump systems, and also the more wary fish are difficult to attract into the pump systems.

Therefore, it is a primary object of the present invention to substantially reduce the number of entrapped fish in water intake systems by providing a system for removing fish of all types and sizes from a flowing stream of water, such as the water intake for industrial purposes, and thereafter returning the fish to a more favorable water area, such as the water source for the intake system. Accordingly, the present invention briefly includes a confined zone of water, adjacent and normally in communication with the flowing stream, into which the fish are attracted or directed, and which can be closed with respect to the flowing stream. Thus, fish, which are attracted or directed because of the natural instincts of the fish to such a zone of water, can be trapped therein and completely removed from the flowing stream. Once removed, the fish are thereafter discharged from the zone to another stream for purposes of transporting the fish to a desired water area.

It is another important object of this invention to provide a fish ejector system which substantially reduces the risk of harm to the fish during their ejection or discharge from a water intake.

Another object of this invention is to provide an effective and economical system for use in ejecting fish from water intakes.

These and other objects and advantages will be made readily apparent from the following detailed description and the accompanying drawings of which:

Figure 1:
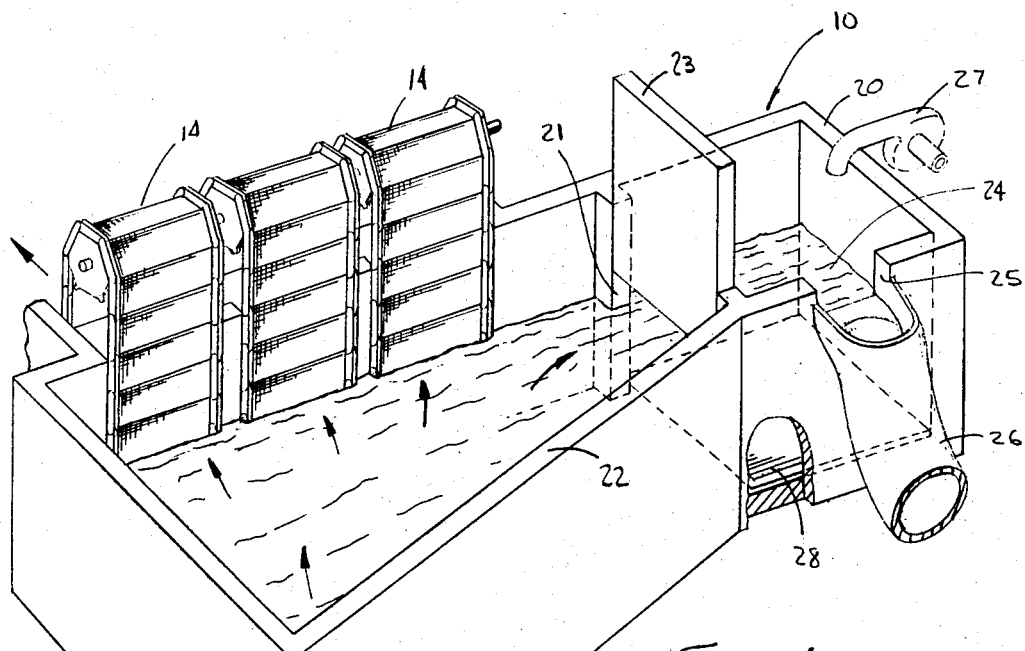
FIG. 1 is a perspective view illustrating the fish ejector system of the present invention in connection with the water intake and screenwell for a large industrial plant.

Referring now to the drawings, and particularly to FIGS. 1 through 4, it is noted that the fish ejector system, generally designated 10, is shown in association with a screenwell 11 of a water intake system, generally designated 12, for an industrial plant. However, it is contemplated that the fish ejector system 10 of the present invention will be useful in any type water intake system or wherever it is desirable to remove fish from a flowing stream of water and thereafter transport the fish to a more favorable water area without injury to the fish.

As shown in FIG. 1, the water intake system 12 includes a conduit or pipe for communicating water from the source. Typically, the inlet end of this pipe 13 is located at a substantial distance from the screenwell and at a substantial depth within the water source. It is at this inlet end (not shown) where the fish enter the water intake system to be thereafter transported through the conduit 13 to the screenwell 11. The screenwell 11 is provided with a plurality of screens 14 which permit the water to pass through on into the plant, but which remove debris such as logs and the like from the water and screen off any fish which might otherwise pass through with the flow of the intake stream.

Adjacent the screenwell and normally in communication therewith is the fish ejector system 10. The fish ejector system includes a compartment 20 having a normally open inlet 21 for communication of water from the screenwell 11. The water communicated to the compartment 20 from the screenwell and substantially confined therein remains in a rather quiet state as compared with the water in the screenwell which forms a part of the main flow stream. It has been found that fish other than anadromous fish will naturally move to such a quiet zone of water as opposed to remaining in the more turbulent water of the screenwell 11. However, while the quiet zone is a preferred means for attracting the fish into the compartment 20 it should be noted that the present invention contemplates other means for attracting or directing fish into the compartment 20 such as lights to attract and noise, air bubbles, or turbulence to direct. To insure a relative and distinct difference between the nature of the water in the screenwell and the compartment, the screenwell channel walls 22 taper in a direction toward the compartment 20 to provide for an increased velocity of the water in the screenwell between the outlet of conduit 13 and the compartment inlet 21 thereby preventing any other distracting quiet areas in the sceenwell.

The compartment 20 is provided with an inlet gate 23 which is closed after a sufficient number of fish have been attracted to the quiet water zone 24. The closing of the gate 23 thereby encloses the compartment 20 with respect to the water in the screenwell and thus traps the fish within the quiet zone 24 for a subsequent discharge therefrom.

Figure 2:
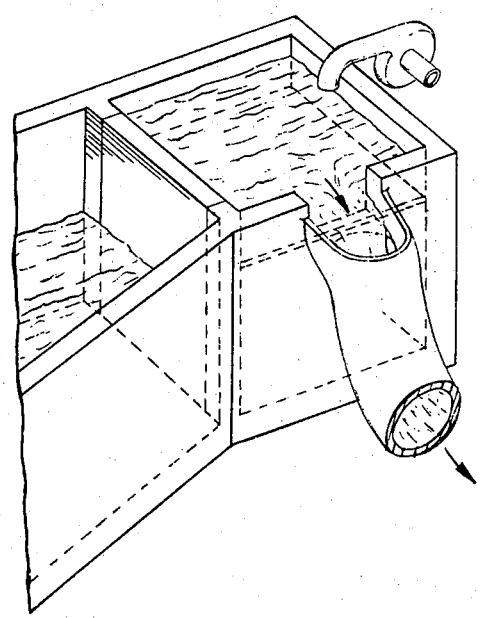
FIG. 2 is a perspective view of the fish ejector system in its preferred embodiment particularly illustrating the means for discharging the fish from a confined quiet zone of water.
Figure 3:
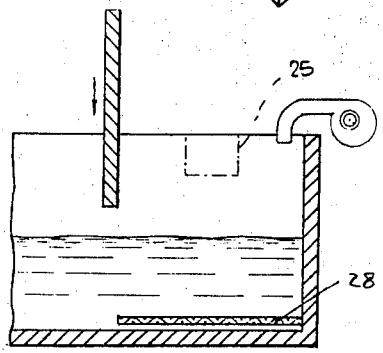
FIG. 3 and FIG. 4 are both side sectional views schematically illustrating the means for first trapping fish and thereafter discharging the trapped fish.
Figure 4:
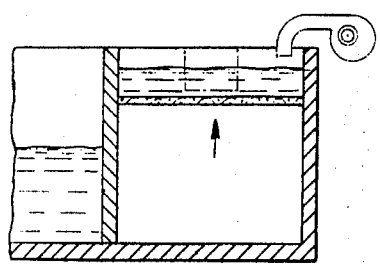

Discharge of the trapped fish forms an important part of the present invention. Several different means for discharge are described below, but each contemplates a discharge of the fish without a substantial risk of injury to the fish. In the preferred embodiment of FIGS. 1 through 4, the compartment also includes an overflow weir 25 with a discharge line 26 extending therefrom. In order to discharge the fish trapped in the quiet zone of the compartment, additional water is added to the compartment by means of a pump 27 which thereby raises the water level of the water within the compartment 20 above the overflow weir 25 as shown in FIGS. 2 and 4, thereby communicating water from the compartment 20 into the conduit 26. It should be noted that this particular means of discharge has the added advantage of providing its own discharge stream for the transportation of the fish to the more favorable water area. That is, a sufficient head is developed by raising the water level in the compartment to cause the water to flow through the conduit 26 to the desired water area which might be a sufficient distance from the screenwell and at the same or higher water level, such as the original water source.

Even after the water has been raised to a level above the overflow weir 25, the fish will not automatically pass through the weir into the discharge conduit 26. Therefore, it is preferable to provide means to force the fish up to the overflow weir 25. One such means contemplated is a screen 28 which substantially covers the floor area between the sidewalls of the compartment 20. After gate 23 has closed and the water level of the compartment 20 is raised as shown in FIG. 4 to force the fish to the water level adjacent the overflow weir 25. Once the fish are at this level they will be eventually drawn out the weir 25 and into the discharge conduit 26.

Once the fish have been discharged from the compartment 20, the pump 27 stops and the gate 23 is opened to re-establish communication between the screenwell 11 and the compartment 20 whereby the process of ejecting the fish may be repeated.

Figure 5:
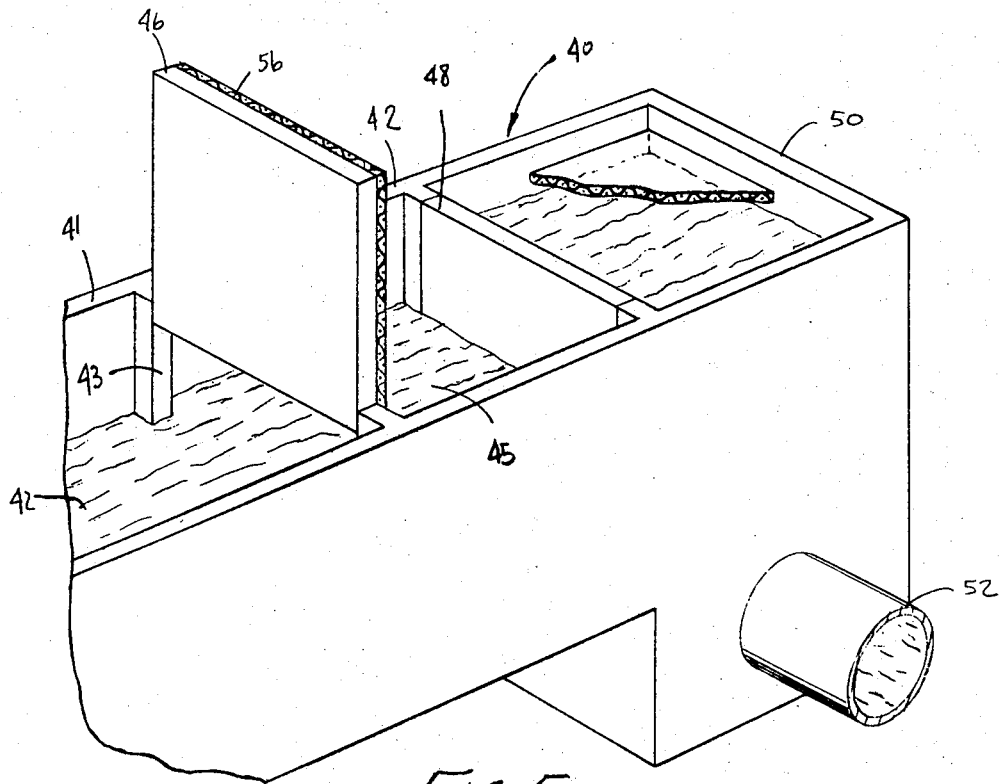
FIG. 5 is a perspective view of a modified form of the fish ejector system.
Figures 6, 7:
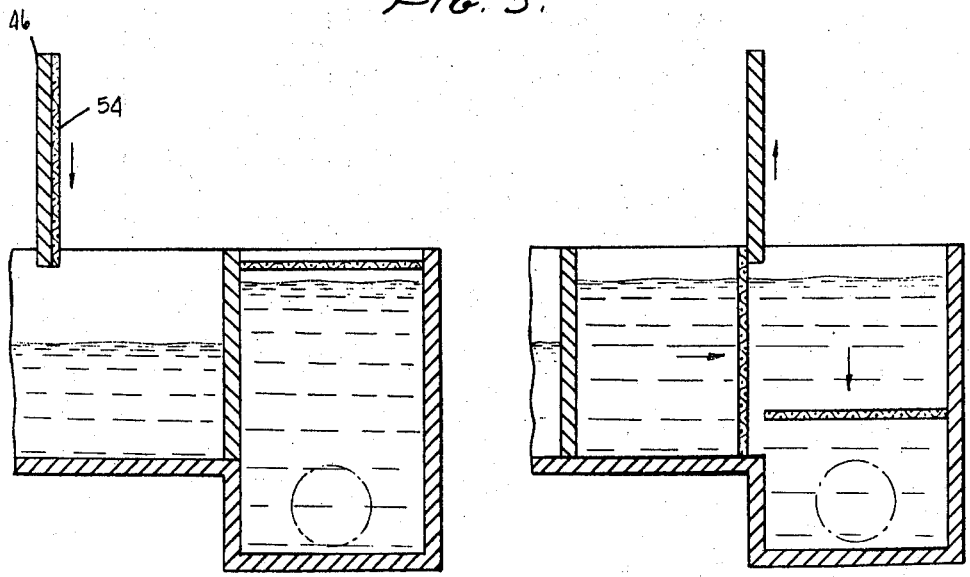
FIG. 6 and FIG. 7 are side sectional views schematically illustrating the operation of this modification.

Referring now to the embodiment shown in FIGS. 5 through 7, it is noted that a somewhat different discharge arrangement is contemplated. The fish ejector system of this embodiment, generally designated 40, is also positioned adjacent a channel 41 having a relatively high velocity stream of water 42a such as in a screenwell. This system also includes a compartment 42 with an inlet 43 normally open to communicate water from the higher velocity stream 42a into the compartment where it is substantially confined thereby and thus remains in a relatively quiet state. This quiet zone of water 44 within the compartment, as in the preferred embodiment, naturally attracts the fish from the higher velocity stream 42a. The fish once attracted to the quiet zone tend to remain therein and after a sufficient number of fish are within the water of the compartment 42, an inlet gate 46 is shut to enclose the compartment 42 with respect to the channel 41 and the water 42a therein thus trapping the fish within the water 44 of the compartment.

In this embodiment of the invention, the compartment 42 is also positioned adjacent another flow stream of water. Typically in industrial plants, water from the intake system after being used for cooling the machinery of the plant is discharged back to the water source. Thus, this embodiment of the invention contemplates using the discharge stream of the plant to transport the fish back to their original habitat. Therefore, compartment 42 is provided with an outlet gate 48 which when opened establishes communication between the compartment 42 and an open well 50. It should be noted that the water level of the well 50 is substantially higher than the level of the water in the channel 41. This is normally the case because the discharge water is being pumped back to the source. Since the well is in direct communication with the discharge line, generally designated 52, the water in the well 50 adjusts to the level representing the head or pressure under which the water in the discharge line 52 is being pumped.

After the gate 46 is closed, gate 48 is opened to establish communication between the water in the compartment 42 and the well 50. It should be noted that this two gate arrangement and the alternate opening and closing these gates 46 and 48 prevents interference of the discharge water with the intake water.

Even after communication between the compartment 42 and the well 50 is established it is generally necessary to direct the fish into the discharge stream 53. This is accomplished by providing a first screen 54 normally adjacent the inside of the gate 46 which covers substantially the cross-sectional area between the sides of the compartment 42 and another second screen 56 normally positioned across the top of the well. After the gate 48 is opened, the screen 54 is moved across the compartment toward the outlet opening provided by the open gate 48 to force the fish into the well 50. To further insure that the fish proceed out into the discharge line 52, the screen 56 is moved downward as shown in FIG. 7 to force the fish into the discharge flow between the incoming discharge conduit 57 and the outgoing discharge conduit 58.

After the fish have been ejected, screens 54 and 56 are returned to their original position and gate 48 is closed while gate 46 is opened to re-establish communication between the compartment and the channel 41. The fish ejecting process can thereafter be repeated.

The other two alternate embodiments of the invention shown in FIGS. 8 through 12 also contemplate the use of an independent discharge stream to transport the fish once they have been separated and removed from the intake stream. In addition, these embodiments contemplate a closed discharge stream as opposed to the open well embodiment shown in FIGS. 5 through 7.

Figure 8:
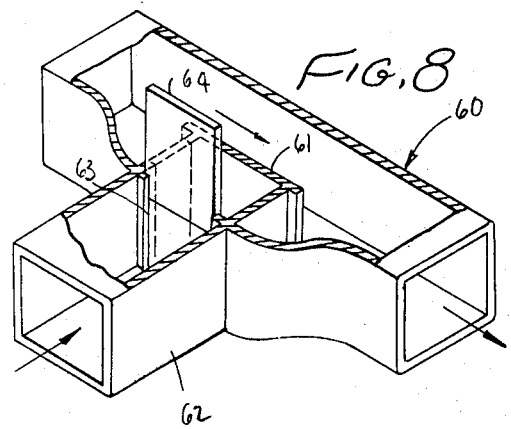
FIGS. 8 and 9 are perspective views partially broken away and schematically illustrate another modified form of the fish ejector system.
Figure 9:
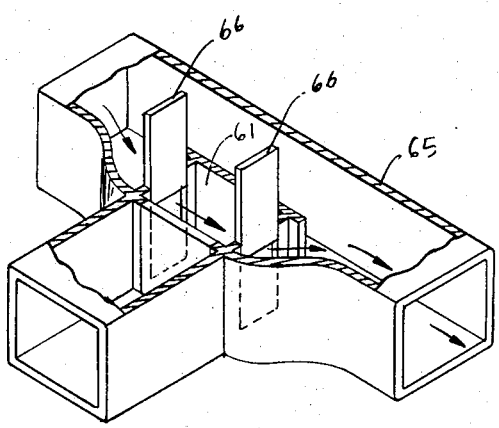

Referring specifically to the embodiment of FIGS. 8 and 9, the fish ejector system, generally designated 60, includes a compartment 61 normally open to and adjacent a channel 62, which might also be closed, carrying a stream of water of relatively high velocity flow. The compartment 61 includes an inlet 63 which provides for communication of the water from channel 62 into the compartment 61.

The water in the compartment 61 is substantially confined therein and thus remains in a relatively quiet state which, as pointed out previously, naturally attracts the fish who are moving in a more turbulent stream. The compartment 61 is also provided at the inlet 63 with a gate 64, as schematically illustrated in FIGS. 8 and 9. This gate is adapted to close and thereby shut off communication between the water in the channel 62 and the quiet zone of water in the compartment 61 thus trapping the fish therein.

It should be noted that the compartment 61 is at this time completely enclosed by its own side walls and the top and the bottom of the closed discharge conduit 65. The side walls of the compartment 61 which are generally perpendicular to the flow of the discharge stream with the discharge conduit are provided with a pair of opposing gates 66. Gates 66 are both open after the gate 64 is closed and thus provide communication between the compartment 61 and the discharge stream. The end wall 67 of the compartment 61 includes extending flanges 70 upstream and downstream of the compartment. The upstream flange assists in diverting a portion of the discharge stream through the open gates 66 and thus across the compartment 61 to flush the compartment 61 and remove the fish trapped therein. After the fish have been discharged from the compartment 61, the gates 66 are closed and gate 64 is opened to re-establish communication between the compartment and the channel 62.

Figure 10:
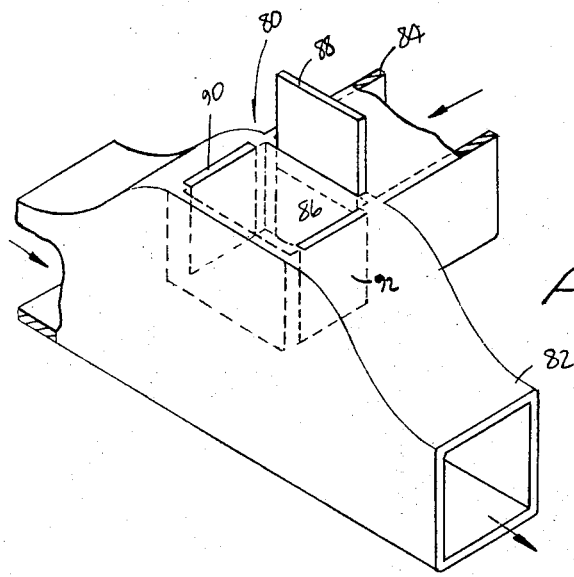
FIGS. 10 through 12 are perspective views partially broken away and schematically illustrate still another modified form of the fish ejector system.
Figure 11:
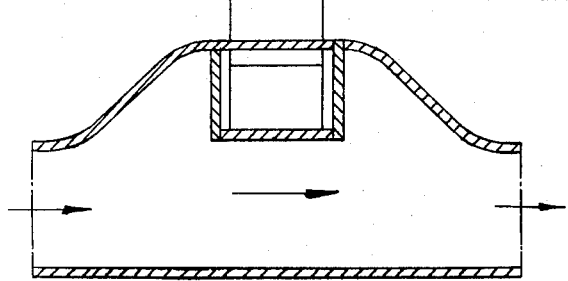
Figure 12:
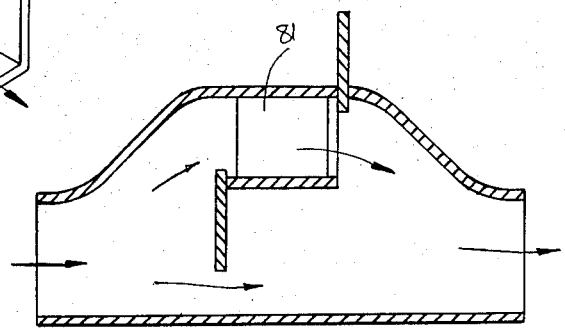

The embodiment of FIGS. 10 through 12, is substantially the same as the system of FIGS. 8 and 9 with the compartment of the system being contained with a closed discharge conduit. However, in contrast to the immediately heretofore described system, the fish ejector system, generally designated 80, of this embodiment includes a compartment 81 which is located above the main flow of the discharge stream within the discharge conduit 82. Fish are attracted to the quiet zone of water within the compartment 81 from the more turbulent water within a channel 84 through a normally open inlet 86. An inlet gate 88 is adapted to block communication between the compartment 81 and the channel 84 after a sufficient number of fish have been attracted into the compartment thus trapping the fish therein. After the gate 88 is closed, opposing gates 90 and 92 in the opposite side walls of the compartment are opened to provide communication between the compartment 81 and the discharge conduit 82.

It should be noted that gate 90 is preferably lowered into the main flow of the discharge stream whereas gate 92 is raised as shown in FIG. 12. Thus, gate 90 has the effect of diverting a portion of the discharge stream into the compartment 81, through the compartment and out the outlet opening provided by the open gate 92 to flush the compartment and discharge the fish trapped therein to the discharge stream. Thereafter, the gates 90 and 92 are closed amd gate 88 opened for a repeat of the fish ejection process.

This invention provides a system for removing fish from a particular flow stream by means which accommodates the natural instincts of the fish. Thus, removal from the flow stream is accomplished in a simple and efficient manner. Once removed, the fish are discharged to another stream which is adapted to transport the fish to a more favorable water area such as the source of the flow stream. The discharge means will accommodate substantially any size fish. Moreover, the system is particularly adapted for the removal of fish from the water intake of a large plant and is adapted to make use of the normal water discharge from the plant to transport the removed fish back to their original location. The system of the present invention would substantially reduce the number of fish trapped in and possibly killed by water intake systems and in particular would reduce the entrapment and killing of the larger fish which comprise the most desirable game species.

Having fully described my invention, it is to be understood that I do not wish to be limited to the details herein set forth, but my invention is of the full scope of the appended claims.

I claim:

1. A fish ejector system, comprising:
    a defined zone of water normally in communication with a first moving stream of water;
    said zone being relatively quiet with respect to the water in the first moving stream for causing fish in said first stream to move according to their natural instincts to said defined zone;
    means preventing quiet zones in the first moving stream of water, said means including a channel defining said first stream, said channel tapering from its inlet end with said defined zone being adjacent the narrow end of said channel thereby providing an increased flow rate of said first stream between said channel inlet and said defined zone;
    means for enclosing said defined zone with respect to said first stream and thereby trapping the fish from said first stream of water therein; and
    means to discharge from said enclosed defined zone fish trapped therein.

2. The fish ejector system of claim 1, wherein said means for enclosing said defined zone comprises a gate.

3. The fish ejector system of claim 1, wherein said discharge means includes a weir and means to fill said enclosed defined zone to raise the water level above said weir.

4. The fish ejector system of claim 3 wherein means are provided to force fish trapped in said defined zone up to said weir.

5. The fish ejector system of claim 3, wherein said filling means comprises a pump.

6. The fish ejector system of claim 1, wherein said discharge means includes a gate, said gate adapted to provide communication between said otherwise enclosed defined zone and a second stream of water.

7. The fish ejector system of claim 6, wherein means are provided to force fish trapped in said enclosed defined zone through said gate and into said second stream.

8. A fish ejector system, for removing fish from a flow stream, comprising:
    conduit means defining said flow stream and in communication with said flow stream source, said conduit means preventing quiet zones in said flow stream;

a compartment normally open to said conduit means for communication thereto of water from said flow stream;

a defined zone of water in said compartment which is relatively quiet with respect to the water in said flow stream to attract fish by their natural instincts from said flow stream into the water in said compartment;

said conduit means including a channel tapering from its inlet end with said defined zone being adjacent the narrow end of said channel thereby providing an increased flow rate of said flow stream between said channel inlet and said defined zone;

means to close said compartment with respect to said conduit means and thereby trap in the water confined therein the fish attracted thereto;

means for selectively providing a path between the confined water in said compartment and a discharge stream; and means to force the trapped fish into said discharge stream from the confined water in said compartment and prevent a return thereto.

9. The fish ejector system of claim 8, wherein said discharge stream is adapted to return fish therein to said flow stream source.

10. A fish ejector system for removing fish from the water intake and thereafter returning the fish to the water intake source, comprising:

means preventing quiet zones in the water intake flow stream;

a compartment adjacent and normally open to the water intake flow stream and defining therein a zone of water;

means to cause fish to move because of their natural instincts, from the water intake flow stream into said defined zone of water, including a zone of water in said compartment which is relatively quiet with respect to the water in said flow stream;

said means preventing quiet zones including a channel tapering from its inlet end, with said defined zone being adjacent the narrow end of said channel thereby providing an increased flow rate of said first stream between said channel inlet and said defined zone;

means for closing said compartment with respect to the water intake flow stream and thereby trap the fish caused to move to said defined zone; and means for removing the trapped fish from said defined zone to a discharge flow stream having a greater head as compared with the intake flow stream.

11. The system of claim 10, wherein said compartment includes a weir and said means for removing the trapped fish includes means for raising the water level within said compartment above said weir and above the water level of the intake flow stream.

12. The system of claim 11, wherein said means for raising the water level comprises pump means for pumping water into said compartment.

13. The system of claim 11, wherein a screen is provided to force the trapped fish up to said weir.

14. The system of claim 10, wherein a well in communication with the discharge flow stream is provided adjacent said compartment with means for providing communication therebetween when said compartment is closed with respect to the intake flow stream.

15. The system of claim 14, wherein means are provided to force the trapped fish first into said well and then into the dishcarge flow stream.

16. The system of claim 10, wherein said compartment is contained within a closed conduit carrying the discharge flow stream.

* * * * *